United States Patent [19]

Leitz et al.

[11] Patent Number: 4,999,420
[45] Date of Patent: Mar. 12, 1991

[54] POLYMERIZATION OF CYCLIC AROMATIC OLIGOMERS WITH LOW TEMPERATURE APROTIC ORGANIC SOLVENT

[75] Inventors: Edgar Leitz, Dormagen; Ludwig Bottenbruch, Krefeld; Karl-Heinz Ott, Leverkusen; Alfred Jung, Krefeld; Ulrich Grigo, Kempen, all of Fed. Rep. of Germany

[73] Assignee: Bayer Aktiengesellschaft, Bayerwerk, Fed. Rep. of Germany

[21] Appl. No.: 407,082

[22] Filed: Sep. 14, 1989

[30] Foreign Application Priority Data

Sep. 20, 1988 [DE] Fed. Rep. of Germany ....... 3831886

[51] Int. Cl.$^5$ ............................................. C08G 64/30
[52] U.S. Cl. .................................... 528/371; 528/171; 528/222; 528/370
[58] Field of Search ................ 528/371, 370, 171, 222

[56] References Cited

U.S. PATENT DOCUMENTS

| | | | |
|---|---|---|---|
| 3,155,683 | 11/1964 | Moody | 260/340.2 |
| 3,274,214 | 9/1966 | Prochaska | 260/340.2 |
| 3,386,954 | 6/1968 | Schnell et al. | 260/47 |
| 3,422,119 | 1/1969 | Prochaska | 260/340.2 |
| 4,299,948 | 11/1981 | Weirauch et al. | 528/171 |
| 4,605,731 | 8/1986 | Evans et al. | 528/371 |
| 4,616,077 | 10/1986 | Silva | 528/371 |
| 4,644,053 | 2/1987 | Brunelle et al. | 528/371 |
| 4,701,519 | 10/1987 | Evans et al. | 528/371 |
| 4,727,134 | 2/1988 | Brunelle et al. | 528/371 |
| 4,754,017 | 6/1988 | Leitz et al. | 528/371 |

*Primary Examiner*—Harold D. Anderson
*Attorney, Agent, or Firm*—Joseph C. Gil; Aron Preis

[57] ABSTRACT

This invention relates to a process for the production of aromatic polycarbonates from cyclic aromatic carbonate oligomers in the presence of aprotic organic solvents at low temperatures.

2 Claims, No Drawings

POLYMERIZATION OF CYCLIC AROMATIC OLIGOMERS WITH LOW TEMPERATURE APROTIC ORGANIC SOLVENT

This invention relates to a process for the production of aromatic polycarbonates from cyclic aromatic carbonate oligomers in the presence of aprotic organic solvents at low temperatures.

U.S. Pat. No. 3,386,954 describes the production of high molecular weight polycarbonates by polymerization of cyclic carbonate oligomers at temperatures of about 200° C. using, e.g., metal oxides or salts of carboxylic acids as catalysts.

EP 0 162 379 describes the production of linear polycarbonates from cyclic carbonate oligomers at temperatures of up to 350° C. using aluminates, titanates, organotin compounds or salts of carboxylic acids as catalysts.

EP 0 198 338 describes the production of linear polycarbonates by polymerization of cyclic carbonate oligomers at temperatures of from 250° C. to 300° C. by means of boron compounds as catalysts.

EP 0 273 143 describes the polymerization of cyclic carbonate oligomers at temperatures of from 200° to 350° C., polymers having alkali metal phenolate groups being used as catalysts.

It has now been found that it is possible to produce aromatic polycarbonates from cyclic aromatic carbonate oligomers under mild conditions, i.e. at low Le A 26 167 temperatures, using an aprotic organic solvent.

The present invention thus relates to a process for the production of aromatic polycarbonates from cyclic carbonate oligomers wherein:

(1.) The polymerization is carried out in the sense of a "living" anionic polymerization in the presence of aprotic organic solvents using organo-alkali metal compounds as initiators.

(2.) The polymerization is carried out at a temperature of from −50° to +100° C., preferably from −20° to +80° C., more preferably from 0 to +60° C.

(3.) The monomer/solvent weight ratio is from 1 to 50:100, preferably from 5 to 35:100, more preferably from 8 to 25:100.

A preferred embodiment of the process according to the present invention is characterized in that:

(1.) aryl-alkali metal and alkyl-alkali metal compounds and alkali metal alcoholates, preferably n-butyl-lithium, s-butyl-lithium, naphthalene-potassium, naphthalene-sodium, potassium phenolate and potassium t-butylate, more preferably n-butyl- and s-butyllithium, are used as the initiators;

(2.) cyclic ethers or aromatic or aliphatic hydrocarbons or mixtures of cyclic ethers and aromatic or aliphatic hydrocarbons, preferably tetrahydrofuran, mixtures of tetrahydrofuran and toluene, and toluene, more preferably tetrahydrofuran, are used as the aprotic organic solvents;

(3.) the monomer/solvent weight ratio 8 to 25:100;

(4.) the polymerization is carried out at a temperature of from 0° to +60° C.;

(5.) the polymerization is carried out under an inert atmosphere (nitrogen or argon), with exclusion of atmospheric oxygen and atmospheric moisture;

(6.) the polymerization-active centres are deactivated; and (7.) the molecular weight of the polymer may be adjusted via the monomer/initiator ratio.

Deactivators for the present purposes are protic compounds, such as water, alcohols, acids or mixtures thereof. Preferred deactivators are mixtures of methanol/hydrochloric acid and methanol/phosphoric acid.

Cyclic aromatic carbonate oligomers are polymerized to linear aromatic homopolycarbonates by the process according to the present invention.

Cyclic aromatic carbonate oligomers in the present context are cyclic compounds corresponding to the following general formula (I):

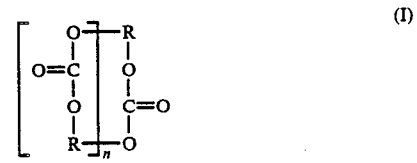

wherein n represents from 1 to 30, preferably from 1 to 20, more preferably from 1 to 12; and R represents a diphenol corresponding to the following general formula (II):

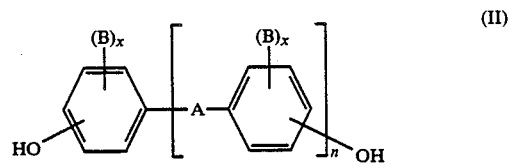

wherein

A represents a single bond, $C_1$-$C_5$ alkylene, $C_2$-$C_5$ alkylidene, $C_5$ or $C_6$ cycloalkylidene, —O—, —SO—, —S—, —$SO_2$—, —CO— or a radical corresponding to the following formula (IIa):

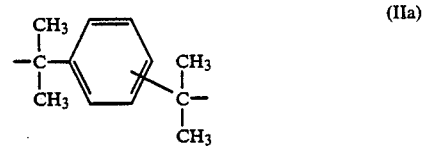

B represents chlorine, bromine or methyl;

X represents 0, 1 or 2; and n represents 1 or 0.

The diphenols are known or may be prepared by known processes.

Suitable diphenols (II) are:
hydroquinone,
resorcinol,
dihydroxyphenyls,
bis-(hydroxyphenyl)-$C_1$-$C_5$-alkanes,
bis-(hydroxyphenyl)-$C_1$-$C_6$-cycloalkanes,
bis-(hydroxyphenyl) ethers,
bis-(hydroxyphenyl) sulphoxides,
bis-(hydroxyphenyl) ketones,
bis-(hydroxyphenyl) sulphides,
bis-(hydroxyphenyl) sulphones and
α,α'-bis-(hydroxyphenyl)-diisopropylbenzenes and nuclear-chlorinated, nuclear-brominated or nuclearmethylated derivatives thereof.

Preferred diphenols (II) are 2,2-bis-(4-hydroxyphenyl)-propane, 2,2-bis-(3,5-dimethyl-4-hydroxyphenyl)-propane, 2,4-bis-(4-hydroxyphenyl)-2-methylbutane, 1,1-bis-(4-hydroxyphenyl)-cyclohexane, 4,4-dihydroxyphenyl sulphide, 4,4-dihydroxyphenyl sulphone and di- and tetra- brominated or -chlorinated derivatives thereof, such as 2,2-bis-(3-chloro-4-hydroxyphenyl)-propane, 2,2-bis(3,5-dichloro-4-hydroxyphenyl)-propane or 2,2-bis-(3,5-dibromo-4-hydroxyphenyl)-propane.

The particularly preferred diphenol is 2,2-bis(4-hydroxyphenyl)-propane.

The production of the cyclic aromatic carbonate oligomers to be employed according to the present invention is known and is described, for example, in EP 0 162 379; EP 0 224 131; DE 2,937,332; DE 3,717,626; U.S. Pat. No. 3,274,214; U.S. Pat. No. 3,422,119; U.S. Pat. No. 3,155,683 and DE-A 1,229,101.

The aromatic polycarbonates which may be produced from cyclic aromatic carbonate oligomers by the process according to the present invention have mean weight-average molecular weights $M_w$ of from 5,000 to 200,000 g/mol, preferably from 10,000 to 100,000 g/mol (determined by gel chromatography after prior calibration).

EXAMPLES

Preparation of the cyclic bisphenol A carbonate oligomers 2.4 g (0.0024 mol) triethylamine, 600 ml methylene chloride, 1,800 ml water and 36 ml (0.6 mol) 45% sodium hydroxide solution were initially introduced into a reaction vessel under nitrogen. A solution of 9.72 g (0.096 mol) triethylamine in 600 ml methylene chloride and a solution of 84.8 g (0.24 mol) bisphenol A bischlorocarbonate: in 1,200 ml methylene chloride were added dropwise at the same time at room temperature in the course of one hour, while stirring at a slow speed (149 rpm). After subsequently stirring for 10 minutes, the mixture was hydrolysed with 3.6% hydrochloric acid and the phases were separated. The aqueous phase was washed with methylene chloride. The organic phases were combined and washed with water and the crude product was isolated by evaporating off the solvent (yield: 58.8 g (90%)).

The pure cyclic bisphenol A carbonate oligomers were obtained by extraction of the crude product with acetone (yield: 23.5 g (40%), based on the crude product).

HPLC analysis gave the following ring distribution:

| Numbers of bisphenol A-carbonate-units in the cycle | Amount weight % |
|---|---|
| 2 | 5 |
| 3 | 25 |
| 4 | 19 |
| 5 | 15 |
| 6 | 10 |
| 7 | 8 |
| 8 | 6 |
| 9 | 4 |
| >9 | 8 |

Relative viscosity: 1.04 (measured in $CH_2Cl_2$ at 20° C. on a 2%, by wt., solution).

POLYMERIZATION EXPERIMENTS

EXAMPLE 1

0.25 ml sec.-butyl-lithium (1.3 molar solution in cyclohexane) was added to a solution of 5 g cyclic bisphenol A carbonate oligomer ($\eta_{rel}$=1.04) in 50 ml tetrahydrofuran at room temperature under nitrogen and while stirring. The temperature was then increased to 50° C. The reaction time at this temperature was 1 hour, a significant increase in the viscosity of the solution occurring. The reaction mixture was then poured into 300 ml methanol/1 molar phosphoric acid (99:1). The polymer was separated off, washed neutral with methanol and dried.

Yield: 4.51 g (90.2%)
Relative viscosity $\eta_{rel}$: 1.53
(measured in $CH_2Cl_2$ at 20° C. on a 2%, by wt., solution)

EXAMPLE 2

0.25 ml sec.-butyl-lithium (1.3 molar solution in cyclohexane) was added to a solution of 5 g cyclic bisphenol A carbonate oligomer in 50 ml tetrahydrofuran at 25° C. under nitrogen and while stirring. The reaction time at 25° C. was 1 hour, a significant increase in the viscosity occurring. The reaction mixture was then poured into 300 ml methanol/1 molar phosphoric acid (99:1). The polymer was separated off, washed neutral with methanol and dried.

Yield: 4.1 g (82%)
Relative viscosity $\eta_{rel}$: 1.61
(measured in $CH_2Cl_2$ at 20° C. on a 2%, by wt., solution)

EXAMPLE 3

0.5 ml sec.-butyl-lithium (1.3 molar solution in cyclohexane) was added to a solution of 10 g cyclic bisphenol A carbonate oligomer in 100 ml tetrahydrofuran at 15° C. under nitrogen and while stirring. The reaction time at this temperature was 1 hour, a significant increase in the viscosity occurring. 12 ml methanol/1 mol or aqueous phosphoric acid (1:1) were then added to the reaction mixture and the reaction product was precipitated in methanol, isolated and dried.

Yield: 8.96 g (89.6%)
Relative viscosity $\eta_{rel}$): 1.73 measured in $CH_2:Cl_2$ at 20° C. on a 2%, by wt., solution)

GPC analysis (bisphenol A polycarbonate calibration):
$M_w$=26,500 g/mol

EXAMPLE 4

0.55 ml sec.-butyl-lithium (1.3 molar solution in cyclohexane) was added to a solution of 10 g cyclic bisphenol A carbonate oligomer in 66 ml tetrahydrofuran at room temperature under nitrogen and while stirring. The reaction time at this temperature was 30 min, a significant increase in the viscosity of the solution occurring. The reaction mixture was then poured into 500 ml methanol/1 molar phosphoric acid (99:1). The precipitated polymer was separated off, washed neutral with methanol and dried.

Yield: 9.9 g (99%)
Relative viscosity $\eta_{rel}$): 1.78 measured in $CH_2:Cl_2$ at 20° C. on a 2%, by wt., solution)

EXAMPLE 5

0.15 ml sec.-butyl-lithium (1.3 molar solution in cyclohexane) was added to a solution of 10 g cyclic bisphenol A carbonate oligomer in 66 ml tetrahydrofuran at room temperature under nitrogen and while stirring. The reaction time at this temperature was 165 min, a significant increase in viscosity occurring. The reaction mixture was then poured into 500 ml methanol/1 molar phosphoric acid (99:1). The precipitated polymer was separated off, washed neutral with methanol and dried.

Yield: 9.3 g (93%)

Relative viscosity $\eta_{rel}$: 3.12 (measured in CH$_2$Cl$_2$ at 20° C. on a 2%, by wt., solution)

GPC analysis (bisphenol A polycarbonate calibration):

$M_w = 70,000$ g/mol

EXAMPLE 6

0.25 ml sec.-butyl-lithium (1.3 molar solution in cyclohexane) was added to a solution of 5 g cyclic bisphenol A carbonate oligomer in 50 ml tetrahydrofuran at 35° C. under nitrogen and while stirring. After a reaction time of 20 min at 35° C. 15 ml solution were removed and introduced into 100 ml methanol/1 molar phosphoric acid (99:1). The product which had precipitated was isolated and dried.

Yield: 1.48 g

Relative viscosity $\eta_{rel}$: 1.54 (measured in CH$_2$Cl$_2$ at 20° C. on a 2%, by wt., solution) GPC analysis (bisphenol A polycarbonate calibration):

$M_w = 19,500$ g/mol

After withdrawal of the sample, a solution of 5 g cyclic bisphenol A carbonate oligomer in 30 ml tetrahydrofuran was added to the reaction mixture. The reaction time was now 1 hour at 35° C. The reaction mixture was then poured into 500 ml methanol/1 molar phosphoric acid. The polymer was isolated, washed neutral with methanol and dried.

Yield: 7.4

Relative viscosity $\eta_{rel}$: 1.87 (measured in CH$_2$Cl$_2$ at 20° C. on a 2%, by wt., solution)

GPC analysis (bisphenol A polycarbonate calibration):

$M_w = 30,000$ g/mol

EXAMPLE 7

25 ml sec.-butyl-lithium (1.3 molar solution in cyclohexane) were added to a solution of 5 g cyclic bisphenol A carbonate oligomer in 50 ml toluene and 25 ml tetrahydrofuran at room temperature under nitrogen and while stirring. The reaction time at this temperature was 1.5 hours, a significant increase in viscosity occurring. The reaction mixture was then poured into 300 ml methanol/1 molar phosphoric acid (99:1). The polymer was separated off, washed neutral with methanol and dried.

Yield: 4.35 g (87%)

Relative viscosity $\eta_{rel}$: 1.33 (measured in CH$_2$:Cl$_2$ at 20° C. on a 2%, by wt., solution)

EXAMPLE 8

0.35 ml naphthalene-potassium (0.89 molar solution in tetrahydrofuran) was added to a solution of 5 g cyclic bisphenol A carbonate oligomer in 50 ml tetrahydrofuran at room temperature under nitrogen and while stirring. The reaction time at room temperature was 1 hour, a significant increase in viscosity occurring. The reaction mixture was then poured into 300 ml methanol/1 molar phosphoric acid (99:1). The polymer was separated off, washed neutral with methanol and dried.

Yield: 4.72 g (94.4%)

Relative viscosity $\eta_{rel}$: 1.78 (measured in CH$_2$Cl$_2$ at 20° C. on a 2%, by wt., solution)

EXAMPLE 9

1.25 mol potassium phenolate (0.265 molar solution in tetrahydrofuran) were added to a solution of 5 g cyclic bisphenol A carbonate oligomer in 50 ml tetrahydrofuran at this temperature under nitrogen and while stirring. The reaction time at room temperature was 1 hour, a significant increase in viscosity occurring. The reaction mixture was then poured into 300 ml methanol/1 molar phosphoric acid (99:1). The polymer was separated off, washed neutral with methanol and dried.

Yield: 4.73 g (94.6%)

Relative viscosity $\eta_{rel}$: 1.41 (measured in CH$_2$Cl$_2$ at 20° C. on a 2%, by wt., solution)

For comparison, the relative viscosities and molecular weights of commercial types of bisphenol A polycarbonate are shown in the Table:

| | rel[1] | $M_w$[2] (g/mol) |
|---|---|---|
| Makrolon ® 3200 | 2.05 | 31,000 |
| Makrolon ® 2800 | 1.91 | 27,000 |
| Makrolon ® 2600 | 1.85 | 24,000 |
| Makrolon ® 2400 | 1.43 | 22,000 |

[1] Determined on a 2%, by wt., solution in CH$_2$Cl$_2$ at 20° C.
[2] GPC analysis using a calibration relationship for bisphenol A polycarbonate.

We claim:

1. A process for the production of a linear aromatic polycarbonate comprising polymerizing at least one cyclic aromatic carbonate oligomeric monomer corresponding to

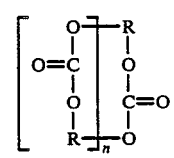 (I)

wherein n represents 1 to 30 and R represents the divalent aromatic radical derived from

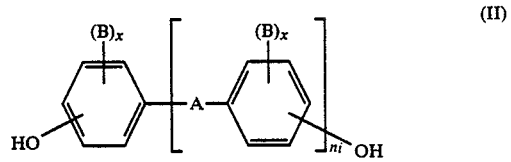 (II)

wherein A represents a single bond or A is C$_{1-5}$ alkylene, C$_2$-C$_5$-alkylidene, C5 or C$_6$ cycloalkylidene, —O—, —SO—, —S—, —SO$_2$—, —CO— or a radical radical corresponding to

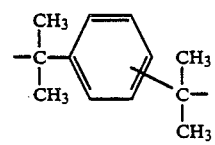 (IIa)

B represents chlorine, bromine or methyl, X represents 0, 1 or 2 n$_1$ represents 1 or 0, in the presence of aprotic organic solvents and at least one organoalkali metal compound initiator, with the exclusion of atmospheric oxygen and atmospheric moisture, the monomer/solvent ratio being from 1 to 50 parts by weight monomer per 100 parts by weight solvent and the polymerization temperature being from −50 to 100° C.

2. A process according to claim 1, wherein the monomer/solvent weight ratio is from 8 to 25 parts, by wt., monomer per 100 parts, by wt., solvent and the polymerization temperature is from 0 to +60° C.

* * * * *